United States Patent
Brückner

(10) Patent No.: US 10,182,314 B2
(45) Date of Patent: Jan. 15, 2019

(54) PROCEDURES FOR PASSIVE ACCESS CONTROL

(71) Applicant: VOLKSWAGEN AG, Wolfsburg (DE)

(72) Inventor: Claus-Peter Brückner, Braunschweig (DE)

(73) Assignee: Volkswagen AG (DE)

( * ) Notice: Subject to any disclaimer, the term of this patent is extended or adjusted under 35 U.S.C. 154(b) by 0 days.

(21) Appl. No.: 15/487,511

(22) Filed: Apr. 14, 2017

(65) Prior Publication Data
US 2017/0303084 A1    Oct. 19, 2017

(30) Foreign Application Priority Data
Apr. 19, 2016  (DE) .................... 10 2016 206 539

(51) Int. Cl.
| | |
|---|---|
| G06F 7/04 | (2006.01) |
| H04B 1/38 | (2015.01) |
| H04W 4/02 | (2018.01) |
| B60R 25/24 | (2013.01) |
| G07C 9/00 | (2006.01) |

(52) U.S. Cl.
CPC .......... *H04W 4/023* (2013.01); *B60R 25/248* (2013.01); *G07C 9/00111* (2013.01); *G07C 9/00007* (2013.01); *G07C 9/00309* (2013.01); *G07C 2009/00349* (2013.01); *G07C 2009/00555* (2013.01); *G07C 2209/08* (2013.01); *G07C 2209/64* (2013.01)

(58) Field of Classification Search
CPC ........ H04W 4/02; H04W 4/023; H04W 40/38
USPC ....................................... 340/5.61
See application file for complete search history.

(56) References Cited

U.S. PATENT DOCUMENTS

| | | | | |
|---|---|---|---|---|
| 5,293,160 A | * | 3/1994 | Kurozu ............... | B60R 25/1003 307/10.2 |
| 5,723,911 A | * | 3/1998 | Glehr ..................... | B60R 25/24 180/287 |
| 6,208,239 B1 | * | 3/2001 | Muller ................... | B60R 25/24 340/10.1 |
| 9,911,262 B2 | * | 3/2018 | Tschache ........... | G07C 9/00309 |

(Continued)

FOREIGN PATENT DOCUMENTS

| | | |
|---|---|---|
| DE | 4409167 C1 | 6/1995 |
| DE | 102005058041 A1 | 6/2007 |

(Continued)

OTHER PUBLICATIONS

Francillon, Aurélien et al.; Relay Attacks on Passive Keyless Entry and Start Systems in Modern Cars, 2011, ETH Library, https://doi.org/10.3929/ethz-a-006708714.*

(Continued)

Primary Examiner — Carlos E Garcia
(74) Attorney, Agent, or Firm — Barnes & Thornburg LLP

(57) ABSTRACT

A method for passive access control including a mobile device serving as key and an interaction unit, the mobile device and the interaction unit having in each case at least one data communication facility for exchanging authorization information. Operations are provided for carrying out an electronic distance measurement between the mobile device and the interaction unit and for permitting an access and/or an interaction only if the distance of the mobile device from the interaction unit is within a permitted distance.

12 Claims, 1 Drawing Sheet

(56) References Cited

U.S. PATENT DOCUMENTS

| | | | | |
|---|---|---|---|---|
| 2006/0176147 A1* | 8/2006 | Pohlmann | ............... | B60R 25/24 |
| | | | | 340/5.61 |
| 2009/0206989 A1* | 8/2009 | Leitch | ..................... | B60R 25/24 |
| | | | | 340/5.61 |
| 2014/0330449 A1 | 11/2014 | Oman et al. | | |
| 2014/0340193 A1* | 11/2014 | Zivkovic | ............ | G07C 9/00111 |
| | | | | 340/5.61 |
| 2015/0015423 A1* | 1/2015 | Takeuchi | ............... | G08G 1/005 |
| | | | | 340/989 |
| 2016/0075307 A1* | 3/2016 | Jakobsson | ............... | B60R 25/31 |
| | | | | 701/2 |
| 2016/0086401 A1* | 3/2016 | Choi | ..................... | H04W 4/008 |
| | | | | 340/5.61 |
| 2016/0292940 A1* | 10/2016 | Tschache | ........... | G07C 9/00309 |

FOREIGN PATENT DOCUMENTS

| | | |
|---|---|---|
| DE | 102009014975 A1 | 9/2010 |
| DE | 102013015478 A1 | 3/2015 |
| EP | 2806406 A2 | 11/2014 |
| WO | 0012848 A1 | 3/2000 |
| WO | 2013050409 A1 | 4/2013 |

OTHER PUBLICATIONS

Search Report for German Patent Application No. 10 2016 206 539.4; dated Sep. 29, 2016.

Wikipedia; Ultra-wideband; downloaded from https://en.wikipedia.org/w/index.php?title=ultra-wideband&oldid=711919137; Mar. 25, 2016.

Search Report for European Patent Application No. 17163008.0; dated Sep. 13, 2017.

\* cited by examiner

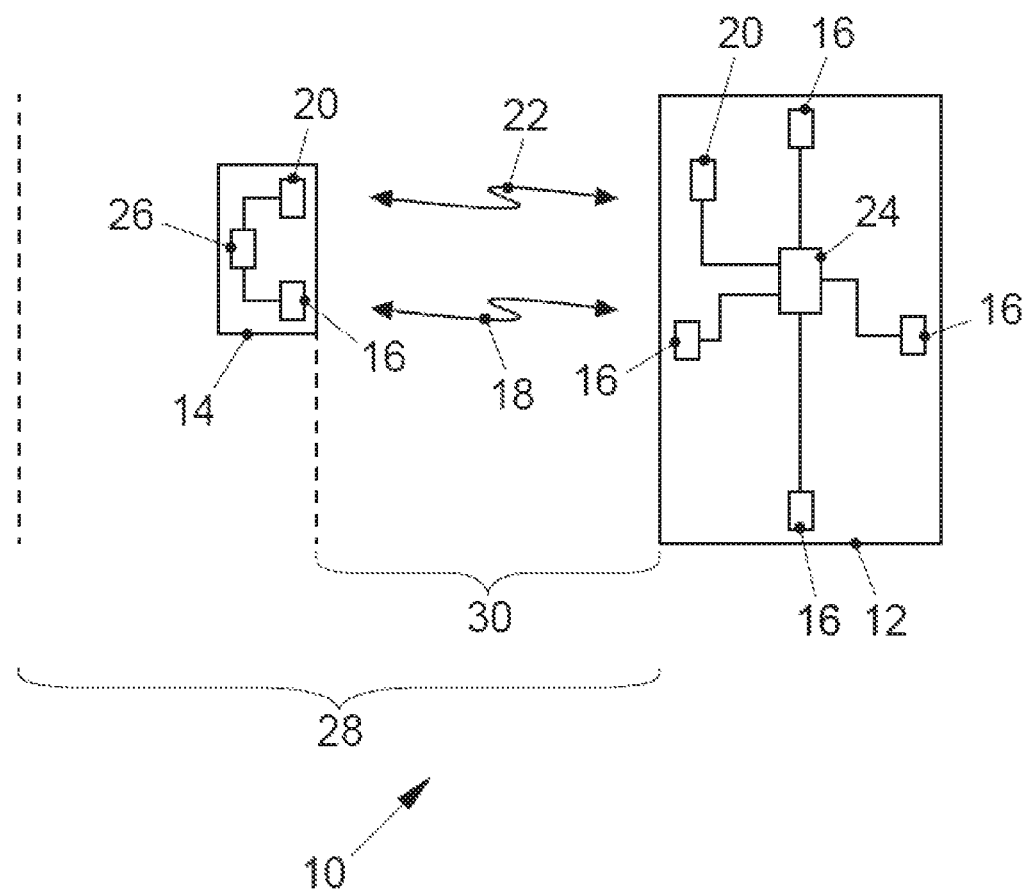

PROCEDURES FOR PASSIVE ACCESS CONTROL

PRIORITY CLAIM

This patent application claims priority to German Patent Application No. 10 2016 206 539.4, filed 19 Apr. 2016, the disclosure of which is incorporated herein by reference in its entirety.

SUMMARY

Illustrative embodiments relate to a method for passive access control, a passive access system and a vehicle having a passive access system.

BRIEF DESCRIPTION OF THE DRAWINGS

Disclosed embodiments will be explained by the associated drawing, in which:

FIG. 1 shows a diagrammatic representation of a passive access system.

DETAILED DESCRIPTION

Functions of a mobile communication device such as, e.g., a smart phone, are increasingly integrated into functions of a motor vehicle. For example, a smart phone which has an NFC interface is used as a motor vehicle key.

In this context, problems arise with regard to both the comfort and the security, for example, in the case of defense against relay attacks, also called relay station attacks (RSA), for virtual vehicle keys in mobile devices.

Known solutions for utilizing mobile telephones as vehicle keys require that the mobile telephone must be brought into the vicinity of antennas, for example, by depositing the mobile telephone at a particular location in the vehicle before starting the engine or by holding the mobile telephone in the near field area of an antenna, for example, in the door handle. Other solutions copy a radio remote control key and require one or more operating actions on the telephone or a smart watch such as, for example, activating a display, inputting a PIN, starting an application and pressing an "unlock vehicle" button.

Both embodiments of the solution require that the mobile telephone must be taken into one's hand and certain operating actions must take place. In the case of traditional passive access systems, also called passive entry or keyless entry, the vehicle key does not need to be taken into one's hand and can remain in the jacket pocket, for example.

With regard to security, no complete securing of mobile devices against relay attacks is known since radio communication links can be generally extended. For example, when NFC near field communication is used in conjunction with mobile telephones for a vehicle access, relay attacks are obstructed by the fact that the communication range is normally limited to a few centimeters. Despite this, however, by means of suitable technical facilities, an RSA attack can still take place even from a greater distance with correspondingly high expenditure such as amplifiers and special antennas.

WO 2013/050409 A1 discloses a method which, as described above, relies on the short range of the radio link.

DE 10 2013 015 478 A1 discloses a method for preventing relay attacks between a mobile communication device and a motor vehicle, both of them using at least one facility for receiving and for processing at least one position signal to be able to determine their own position and then being calibrated to recognize a remote relay attack.

DE 10 2009 014 975 A1 discloses a method for remotely controlling a vehicle access and/or vehicle start by means of a quasi stationary control device located in a vehicle, and a mobile transponder. Between the control device and the transponder, a radio signal is transmitted via a radio link in at least one direction and an ultrasonic signal via an ultrasonic link in at least one direction. In the method, the authorization for vehicle access and/or vehicle start is checked by means of coded communication via the radio link and by means of the ultrasonic signal.

DE 44 09 167 C1 discloses a facility for controlling the keyless access to a motor vehicle with a transmitting unit arranged in the motor vehicle, with a transceiver carried along by a user and with a distance detecting device which measures the distance between the transceiver and the motor vehicle.

DE 10 2005 058 041 A1 discloses a method for operating an access protection system. The access protection system has an object station having a first transmitting and receiving unit and a mobile station, which can be carried along by an authorized user, having a second transmitting and receiving unit. In addition, the object station and mobile station are configured for exchanging signals for establishing an access authorization.

Disclosed embodiments increase both the comfort and the security of a passive access control comprising a mobile device serving as key. Disclosed embodiments provide a method, a passive access system and a vehicle.

The disclosed method for passive access control comprising a mobile device serving as key and an interaction unit, the mobile device and the interaction unit having in each case at least one data communication facility configured for exchanging authorization information, comprises the operations:

carrying out an electronic distance measurement between the mobile device and the interaction unit;
  permitting an access and/or an interaction only if the distance of the mobile device from the interaction unit is within a permitted distance.

In this context, the permitted distances and tolerances for the comfortable and passive engine start and access without interaction on the mobile device are specified by legal requirements, for example, the mobile device authorizing for the engine to start must be located within the outer vehicle sheath at the engine start, the access-authorizing mobile device must be no more than two meters away from the outer vehicle sheath on unlocking the vehicle. These permitted distances can now also be used for the evaluation of whether there is a relay attack present or not. However, other distance limit values adequate for defense against relay attacks which permit greater distances can also be utilized for evaluation. The defense against relay attacks is based on the fact that the electronic distance measuring facility is designed in such a manner that no manipulation of the distance measurement is possible. This is ensured by the fact that firstly the distance measurement is based on a signal transit time measurement and secondly it is ensured that the distance measurement takes place between the mobile device used as vehicle key and the interaction unit. It is especially when the legal requirements with respect to the permitted distances for a passive engine start and an access cannot be determined sufficiently accurately by the distance measuring facility used for defense against relay attacks that different measuring facilities and/or measuring methods can be applied for the distance measurement for a passive engine start and an access or, respectively, for the distance measurement for defense against relay attacks.

Mobile devices are here considered to be not only smart phones, but also smart watches, wearables, tablets, smart cards, tokens or the like which are suitable to carry out the method for passive access control, at least that part of the mobile device. A security-related interaction unit can be, for example, a vehicle or a component of a vehicle such as, for example, a vehicle door handle, an engine starting device but also a wireless payment terminal or an access system, for example, to a building or a room. The items of authorization information or their exchange, respectively, can comprise a more complex authentication method or also the exchange of a code. An electronic distance measurement is proposed here since, in contrast to an optical measurement, it can also penetrate materials of clothing or pockets, which simplifies the handling.

The disclosed method provides that more secure and at the same time move comfortable access can be achieved also with mobile devices. By means of a reliable electronic distance measurement, it is found whether the mobile device is within a permitted distance before an access or an interaction such as a functional access or the carrying out of an authentication is allowed to be executed. The permitted distance can be the direct distance from an electronic distance measuring facility or an outer surface of the interaction unit such as an outer sheath of a vehicle or of a door. This distance can be within a range of a few meters such as, for example, two meters, up to several centimeters such as, for example, ten centimeters.

It can be provided that the mobile device and the interaction unit in each case measure the distance and that an access and/or an interaction is permitted only if a deviation of the two measured distances is zero or less than a predetermined limit value. By means of this communication, the identity between the transmitting object and the measured or detected object, in this case in each case of the mobile device (from the point of view of the interaction unit) can be ensured. By this means, a relay attack can be eliminated. By means of the electronic distance measuring facility which measures the true distance between mobile device and a security-related interaction unit it is ensured that the mobile device is really in the vicinity of the security-related interaction unit. The measurement result is used to evaluate whether the mobile device is within the vicinity of the security-related interaction unit. By this means, relay attacks are effectively detected and averted. Thus, for example, the execution of security-related applications is prevented.

It can also be provided that the mobile device transmits the measured distance to the interaction unit and that the deviation is determined by interaction unit. Alternatively, the deviation can be determined and/or processed by other elements such as, for example, a back end which is connected to the interaction unit such as, for example, a vehicle. The processing in the interaction unit occurs directly in the unit to which access is desired so that no further data transmissions are necessary. By this means, the security and the speed of processing can be increased.

The electronic distance measurement can be based on a transit time measurement of a radio signal. A transit time measurement, also called time of flight (ToF), can be carried out reflectively, similar to, for example, a radar, or implemented via signals, for example, using a timestamp.

It can be provided that between the mobile device and the interaction unit an authentication method is performed and that an access and/or an interaction is permitted only in the case of successful authentication. Traditional challenge-response methods can be used. It can be left open as to whether, in a chain of authorization checks, it is the authentication method or the electronic distance measurement or the evaluation thereof, respectively, which is carried out first.

It can also be provided that a data exchange and/or an authentication method are performed between the mobile device and the interaction unit via a service and/or a link of the electronic distance measurement. This link can be configured additionally to the data communication facility for exchanging authorization information or it can handle the tasks of the data communication facility completely. In the latter case, a data communication facility is integrated in the electronic distance measurement so that an independent data communication facility can be omitted, which lowers costs and complexity.

It can also be provided that the electronic distance measurement is carried out when a contact information item is detected. This contact information can be implemented by a sensor such as a proximity sensor or a contact sensor at a door handle or by the detection of a communication partner of a radio link, for example, by a period transmission signal. Such methods can reduce the energy consumption since essential parts can remain switched off until they are actually needed.

The disclosed passive access system comprising a mobile device serving as key and an interaction unit, the mobile device and the interaction unit having in each case at least one data communication facility configured for exchanging authorization information, provides that the mobile device and the interaction unit have in each case an electronic distance measuring facility configured for determining the distance between the mobile device and the interaction unit and that the mobile device and/or the interaction unit are configured to permit an access and/or an interaction only if the distance of the mobile device from the interaction unit is within a permitted distance. The same benefits and modifications apply as described before.

The mobile device and/or the interaction unit can be configured to permit an access and/or an interaction only if a deviation of the two measured distances is zero or less than a predetermined limit value. By means of this communication, the identity between the transmitting object and the measured or detected object, in this case in each case of the mobile device (from the point of view of the interaction unit) can be ensured. By this means, a relay attack can be excluded.

The data communication facilities can be configured to exchange authorization information in the context of an authentication method and an access and/or an interaction can only be permitted in the case of successful authentication. Traditional challenge-response methods can be used. It can be left open as to whether in a chain of authorization checks, the authentication method or the electronic distance measurement or the evaluation thereof, respectively, is performed first.

The distance measuring facilities can have radio-frequency transmitters and/or receivers. Radio-frequency signals begin at a frequency of about 1 GHz. Frequency ranges or bands in the ranges of, for example, 2.4 GHz, 4 or 5 GHz or higher can be easily used since they provide steep-edged, short signals or pulses for the time measurement.

It can be provided that the distance measuring facility can be attached or has been attached subsequently on the mobile device utilized as vehicle key or has been integrated into it already during production of the mobile device. Due to the subsequent attachment, mobile devices already existing can also be equipped with the electronic distance measuring facility so that mobile devices already existing can also be protected against relay attacks. Similarly, it is possible to install the distance measuring facility already during the manufacture of a mobile device, which allows good integration into the mobile device.

The distance measuring facilities can be configured to detect reflected signals and not to use these in a calculation of the distance. Reflected signals can become superimposed on directly received signals and distort these, as a result of which measurements can be corrupted. For example, suppression or filtering of reflections can improve the accuracy of the distance measurement.

The disclosed vehicle having a passive access system provides that an electronic distance measuring facility configured for determining the distance between a mobile device and the vehicle is provided and that the electronic distance measuring facility is configured to carry out a method as described before. The same benefits and modifications apply as described before. The passive access system proposed here is useful for vehicles since at the same time a high relevance to security and a wish for comfort are given.

It can be provided that a number of electronic distance measuring facilities are provided in the vehicle and/or that the distance measuring facilities can be attached or have been attached subsequently on the vehicle or have already been integrated in it during the production of the vehicle. The distance measuring facilities can be attached in or on the vehicle, optionally with emitting and/or receiving areas arranged next to one another or overlapping one another partially to thus offer a gapless access possibility from all directions with a good receiving characteristic. Due to the subsequent attachment, vehicles already existing can also be equipped with the electronic distance measuring facility so that existing vehicles can also be protected against relay attacks. Similarly, it is possible to install the distance measuring facility or the distance measuring facilities already during the production of a vehicle which allows good integration into the vehicle systems.

The various disclosed embodiments, mentioned in this application, can be combined with one another unless they are constructed differently in the individual case.

FIG. 1 shows a passive access system 10 having a vehicle 12 acting as interaction unit and a mobile device 14. A diagrammatic representation of a vehicle 12, in this case, a passenger car, is shown. Land vehicles such as, for example, trucks, buses, motorcycles, rail vehicles and air and water vehicles are also considered to be vehicles. As an interaction unit, the vehicle 12 is shown here by way of example. An interaction unit can also be, for example, a wireless payment terminal or an access system, for example, to a building or to a room.

The mobile device 14 can be a smart phone or the like which serves as electronic key for the access, the activation of a function or the start of the vehicle 12.

Firstly, the individual components of the passive access system 10 or the vehicle 12, respectively, and the mobile device 14 are described. The method for passive access control will be described thereafter.

The vehicle 12 has a number of electronic distance measuring facilities 16, four of which are shown here by way of example. The electronic distance measuring facilities 16 may be distributed over the volume of the vehicle 12 to achieve good accessibility. The mobile device 14 also has an electronic distance measuring facility 16. Because of the small dimensions of the mobile device 14, one electronic distance measuring facility 16 is sufficient.

By means of the electronic distance measuring facility 16 in the vehicle 12 and the mobile device 14, an electronic distance measurement 18 takes place by means of which the precise distance of the mobile device 14 from the vehicle 12 can be determined. The electronic distance measurement 18 is based on a transit time measurement of a radio signal using, for example, an UWB (ultra wide band) radio technology or another radio-frequency technology such as, for example, WLAN as carrier.

Furthermore, a data communication facility 20 for carrying out an authentication method 22 are provided in each case in the mobile device 14 and in the vehicle 12. These data communication facilities 20 are optional since this and also further radio traffic services, too, can be carried out via a service or carrier of the electronic distance measuring facilities 16.

In the vehicle 12, there is a control device 24 or a computing unit which is connected to the facilities 16 and 20 to control the communication and to perform the method described in the text which follows, for passive access control, at least partially. The control device 24 can be, for example, component of a communication unit or a communication control device. In the mobile device 14, there is also a computing unit 26, for example, a processor, also within a one-chip system (system on a chip, SoC). The computing unit 26 is connected to the facilities 16 and 20 to control the communication and to perform the method for passive access control, described in the text which follows, at least partially.

In the text which follows, the method for passive access control is described by means of which the actual location or the actual distance, respectively, of the electronic key as the mobile device 14 can be established. More precisely, the actual location or the actual distance of the transmitter of the transmitted signal can be established via the electronic distance measurement 18.

A permitted distance 28 from the vehicle 12 is specified, for example, two meters. The permitted distance 28 can be related to individual electronic distance measuring facilities 16 or copy the external sheath of the vehicle 12. Firstly, a mobile device 14 approaching the vehicle 12 is outside the permitted distance 28 so that access or interaction between the mobile device 14 and the vehicle 12 is not yet permitted. However, establishing contact, for example, via transmitted beacon signals, can already take place so that the two partners have knowledge of one another.

If then the mobile device 14 is located within the permitted distance 28, as shown in FIG. 1, the electronic distance measurement 18 can take place. For this purpose, at least one electronic distance measuring facility 16 from the vehicle 12 or the mobile device 14 measures the distance 30 and sends it to the control device 24 for evaluation and further processing. Correspondingly, access and/or interaction is allowed only if the distance 30 of the mobile device 14 from the interaction unit, in this case, the vehicle 12, is within the permitted distance 28.

The security can be enhanced even further in that the mobile device 14 and the vehicle 12 in each case measure the distance and the two measured distances are compared. It is only when a deviation of the two measured distances is zero or less than a predetermined limit value that an access and/or an interaction is permitted. In concrete terms, the mobile device 14 transfers its measured distance to the vehicle 12 where the two distances are compared in the control device 24. The predetermined limit value should exceed measurement inaccuracies of the transit time measurement, otherwise the choice depends on the respective use, for example, on the length of the permitted distance 28 and/or on the security profile demanded.

Once the actual distance 30 between the mobile device 14 and the vehicle 12 is confirmed as lying within the permitted distance 28, an authentication method 22 is performed. In the present example, this sequence is selected. It is possible to firstly perform the authentication method 22 and then the electronic distance measurement 18. The authentication method 22, for example, a challenge-response method, ensures that the mobile device 14 has the necessary authorizations for the vehicle 12. The authentication method 22 can be performed either via the electronic distance measuring facilities 16 or via the data communication facilities 20. In the case of successful authentication, an access and/or an interaction can take place.

When either the electronic distance measuring facility 16 or the authentication method 22 have not been successfully concluded, this can mean that a relay attack is occurring or that an unauthorized person wishes to gain access to the vehicle 12. In these cases, the access method is aborted. It is possible to take measures such as sending a warning message to the vehicle owner or to a service, recording the attack with a vehicle camera, activating light and/or the horn or the like.

The disclosed method provides that a secure and at the same time comfortable access can be achieved also by means of mobile devices.

LIST OF REFERENCE SYMBOLS

10 Passive access system
12 Vehicle
14 Mobile device
16 Electronic distance measuring facility
18 Electronic distance measurement
20 Data communication facility
22 Authentication method
24 Control device
26 Computing unit
28 Distance
30 Permitted distance

The invention claimed is:

1. A method for passive access control wherein a mobile device, serving as a transportation vehicle key, and a corresponding transportation vehicle wherein the mobile device and the transportation vehicle each has at least one data communication facility for exchanging authorization information, the method comprising:
   carrying out an electronic distance measurement between the mobile device and the transportation vehicle based on a transit time measurement of a radio signal transmitted between the mobile device at the transportation vehicle, wherein the electronic distance measurement is performed at both the mobile device and the transportation vehicle, wherein the mobile device includes an electronic distance measuring facility and the transportation vehicle includes a plurality of electronic distance measuring facility each configured to determine distance between the mobile device and the respective one of the plurality of electronic distance measuring facilities included on the transportation vehicle; and
   permitting an access and/or an interaction with the transportation vehicle only in response to the measured distance between the mobile device and at least one of the plurality of electronic distance measuring facilities included on the transportation vehicle being within a permitted distance distances measured by the electronic distance measuring facility of the mobile device and at least one of the plurality of electronic distance measuring facilities of the transportation vehicle being zero or less than a predetermined limit value.

2. The method of claim 1, further comprising the mobile device transmitting the measured distance determined by the electronic distance measuring facility of the mobile device to the transportation vehicle,
   wherein the deviation is determined by the transportation vehicle.

3. The method of claim 1, further comprising performing, between the mobile device and the transportation vehicle, an authentication method for authenticating the mobile device, wherein the access and/or interaction of the transportation vehicle is permitted only in response to successful authentication.

4. The method of claim 1, further comprising performing a data exchange and/or an authentication method between the mobile device and the transportation vehicle via a service and/or a communication link.

5. The method of claim 1, wherein the electronic distance measurement performed by the mobile device and the transportation vehicle is carried out in response to detection of contact or proximity information detected by a component of the transportation vehicle.

6. A passive access system comprising:
   a mobile device serving as a transportation vehicle key; and
   a transportation vehicle,
   wherein the mobile device and the transportation vehicle each has at least one data communication facility configured for exchanging authorization information,
   wherein the mobile device has an electronic distance measuring facility and the transportation vehicle has a plurality of electronic distance measuring facilities, wherein each electronic distance measuring facility is configured for determining distance between the mobile device and the respective one of the plurality of electronic distance measuring facilities of the transportation vehicle,
   wherein the electronic distance measurement of the distance between the mobile device and each of the plurality of electronic measuring facilities of the transportation vehicle is performed at both the mobile device and each of the plurality of electronic distance measurement facilities of the transportation vehicle,
   wherein the mobile device in cooperation with the transportation vehicle permit an access and/or an interaction to the transportation vehicle only in response to distance of the mobile device from the at least one of the plurality of electronic distance measurement facilities of the transportation vehicle being within a permitted distance, and a deviation of the distances measured by the mobile device and the at least one of the plurality of the electronic distance measurement facilities of the transportation vehicle being zero or less than a predetermined limit value, and
   wherein the electronic distance measurement performed at both each of the electronic distance measurement facilities is based on a transit-time measurement of a radio signal transmitted between the mobile device and the transportation vehicle.

7. The passive access system of claim 6, wherein the data communication facilities exchange authorization information for authentication of the mobile device, and the access and/or interaction with the transportation vehicle is only permitted in response to successful authentication.

8. The passive access system of claim 6, wherein the distance measuring facilities include radio-frequency transmitters and/or receivers.

9. The passive access system of claim 6, wherein the distance measuring facility for the mobile device is attached or attachable to the mobile device or integrated into the mobile device during production of the mobile device.

10. The passive access system of claim 6, wherein the distance measuring facilities are configured to detect reflected signals, wherein distance is calculated by the distance measuring facilities without reference to the reflected signals.

11. A transportation vehicle having a passive access system, comprising:
   a plurality of electronic distance measuring facilities that determine distance between a mobile device and respective ones of the plurality of the electronic distance measuring facilities of the transportation vehicle,
   wherein the mobile device serves as a key for the transportation vehicle,
   wherein the mobile device and the transportation vehicle each have at least one data communication facility for exchanging authorization information,
   wherein the mobile device includes an electronic distance measuring facility and the transportation vehicle comprises the plurality of electronic distance measuring facilities,
   wherein electronic distance measurement is performed by each of the electronic distance measuring facilities at the mobile device and at the transportation vehicle based on a transit time measurement of a radio signal transmitted therebetween, wherein access and/or an interaction with the transportation vehicle is performed only in response to the distance between the mobile device and at least one of the plurality of electronic distance measuring facilities of the transportation vehicle being within a permitted distance, and a deviation of the distances measured by the plurality of electronic distance measuring facilities being zero or less than a predetermined limit value.

12. The vehicle of claim 11, wherein the plurality of electronic distance measuring facilities of the transportation vehicle are attached or on the transportation vehicle or integrated in the transportation vehicle during production of the transportation vehicle.

\* \* \* \* \*